Figure 1:
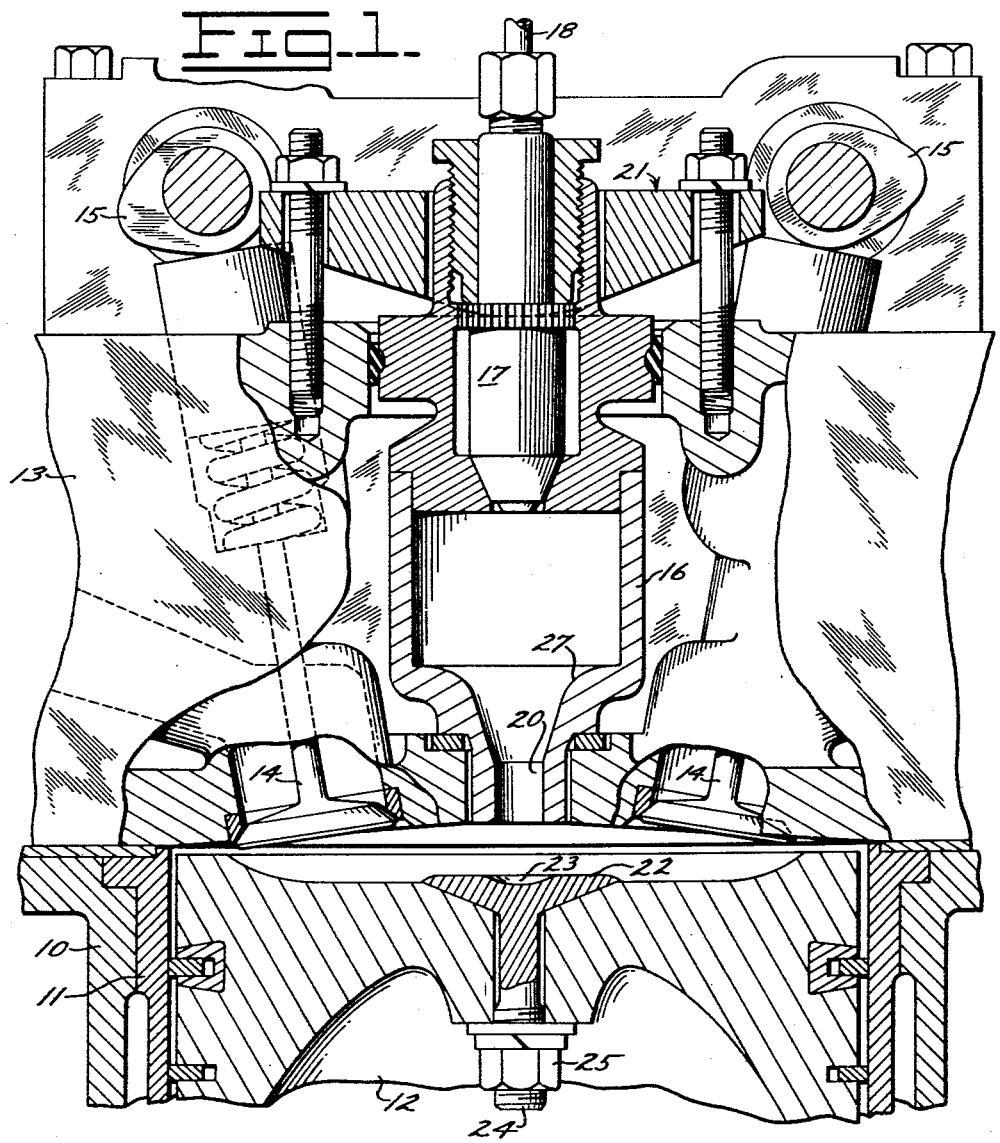

INVENTORS
PAUL H. BRANdes
HARRY M. KiLey
BY
ATTORNEYS

United States Patent Office 3,035,559
Patented May 22, 1962

3,035,559
COMBUSTION AND PRECOMBUSTION CHAMBERS FOR COMPRESSION IGNITION ENGINES
Paul H. Brandes, Peoria, and Harry M. Kiley, Washington, Ill., assignors to Caterpillar Tractor Co., Peoria, Ill., a corporation of California
Filed Apr. 27, 1960, Ser. No. 25,145
3 Claims. (Cl. 123—32)

This invention relates to the combustion space of engines and particularly to the configuration and relationship to each other of the combustion chamber and the precombustion chamber.

Many configurations have been restored to in the combustion space of compression ignition engines for the purpose of promoting good distribution of the fuel air mixture in the main combustion chamber as it enters from the precombustion chamber where fuel sprayed from the injection orifice is mixed with a small quantity of air. Cratered piston heads of various forms and eccentric positioning of precombustion chambers have proven acceptable in engines having high turbulence such as some designs of two valve engines. Four valve engines are characterized by relatively low turbulence in the main combustion chamber and give rise to difficulty in obtaining good distribution of the combustible mixture entering the chamber.

The present invention was designed for and is disclosed herein in its application to a four-valve engine though it is also beneficial in engines of other types.

It is the object of the present invention to provide an arrangement of combustion space in an engine that will insure even and thorough distribution of a combustible mixture as it is injected into the main combustion chamber thereof.

Further and more specific objects and advantages of the invention and the manner in which they are carried into practice are made apparent in the following specification wherein the invention is described in detail by reference to the accompanying drawing.

Figure 2:
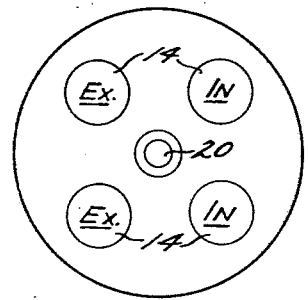

In the drawing:

FIG. 1 is a fragmentary view partially in section through the upper portion of an engine cylinder showing the combustion chamber thereof and the precombustion chamber and injection mechanism disposed thereabove; and FIG. 2 is a schematic view illustrating the position of the valves in the cylinder head with relation to the precombustion chamber outlet.

FIG. 1 shows a small portion of an engine cylinder block at 10 supporting a cylinder liner 11 within which a piston partially shown at 12 reciprocates. A head casting shown at 13 supports the usual valves 14 which in the present case are actuated by overhead cams 15 in a well known manner. A precombustion chamber 16 is also supported in the head casting and an injection valve, the exterior of which is illustrated at 17, receives fuel under pressure through a line 18 and sprays it through the usual nozzle and into the precombustion chamber in direct alignment with its orifice or throat 20 which opens into the main combustion chamber bounded by the head of the piston 12 and the opposed surface of the head block 13. The assembly of injection nozzle and precombustion chamber is retained in place by conventional clamping means generally indicated at 21.

The present invention pertains to the configuration of the combustion space, including the precombustion chamber and main combustion chamber which are designed to promote thorough and uniform distribution of the fuel air mixture passing from the precombustion chamber to the main combustion chamber on the downward power stroke of the piston 12. The arrangement of the valves 14 with respect to the main combustion chamber is illustrated schematically in FIG. 2 wherein four valves are shown as equally spaced radially and circumferentially with respect to the throat 20 of the precombustion chamber, two being exhaust valves and two being intake valves. This particular number and arrangement of valves produces a relatively quiescent condition in the main combustion chamber during operation of the engine tending to prevent good distribution of the fuel air mixture entering the chamber from the precombustion chamber. To improve this condition, the piston 12 is formed with a shallow concentric cavity or dish in its head end with a centrally disposed slightly raised flat portion shown at 22 which in turn has a central dimple or small cavity shown at 23 which, as contrasted to deeper pockets formed in some piston heads, is formed on a spherical radius of about 1" and is approximately .07" deep. In the present case, the raised portion 22 with the dimple 23 herein is shown as a heat plug formed of material more highly resistant to heat than the body of the piston and retained in place by a threaded stem 24 and nut 25. Heat plugs of this general character are well known for the purpose of preventing erosion of the softer piston material at the hottest area within the combustion chamber.

With the construction disclosed, the jet or spray of combustible mixture leaving the throat 20 of the precombustion chamber impinges centrally of the cavity or dimple 23 and is directed radially outwardly in a uniform pattern throughout the full 360° of the circular combustion chamber thus insuring even distribution thereof throughout the chamber and the desired even and complete burning thereof when it is ignited by the heat of compression of the upward compression stroke of the piston 12.

Means are also provided to insure against liquid fuel, not thoroughly mixed with air, entering the main combustion chamber. To prevent this, that area of the precombustion chamber between the throat 20 and the main body thereof is provided with a rounded shoulder, as indicated at 27, so that air flowing upwardly into the precombustion chamber is induced to follow a course overlying the side walls where this shoulder is provided and preventing adherence thereto of liquid fuel particles which are free to drip into the main combustion chamber creating poor combustion and a smokey exhaust condition. In other words this rounded contour in the precombustion chamber keeps the boundary layer of the incoming air from separating from the walls of the chamber and prevents the fuel spray from impinging on the walls of the precombustion chambers. When liquid fuel is splashed on the walls fuel economy is poor and a smoky exhaust results. Shoulder 27 also serves to define a concentrated flow of the fuel air mixture discharging against the dimple 23, especially under engine lug (low speed and high load) conditions.

Some types of engines are known in which the throat of the precombustion chamber extends into the main combustion chamber and has multiple orifices for directing the fuel mixture radially outwardly into the main combustion chamber. Furthermore some engines constructed in this manner are known to have a dimple or depression in axial alignment with the throat of the precombustion chamber. They do not, however, employ the construction of the present invention wherein a single axially directed orifice directs the fuel mixture into a shallow cavity of only slightly greater diameter than the orifice itself for disbursing it radially outwardly through a large shallow depression in the head of the piston.

I claim:

1. In the combustion area of a compression ignition engine which includes a main combustion chamber with one wall formed by a piston of the engine, and a pre-combustion chamber having a throat through which a combustible mixture of fuel and air are directed axially toward the piston, a small depression disposed centrally of the head of the piston to effect outward radial dispersion of the mixture as it impinges therein, said piston head being of generally flat contour with a concentrically disposed flat bottom crater therein.

2. In the combustion area of a compression ignition engine which includes a main combustion chamber with one wall formed by a piston of the engine, and a pre-combustion chamber having a throat through which a combustible mixture of fuel and air are directed axially toward the piston, a small depression disposed centrally of the head of the piston to effect outward radial dispersion of the mixture at it impinges therein, and an annular raised portion surrounding said depression, said piston head being of generally flat contour with a concentrically disposed flat bottom crater therein.

3. In the combustion area of a compression ignition engine which includes a main combustion chamber with one wall formed by a piston of the engine, and a pre-combustion chamber having a throat through which a combustible mixture of fuel and air are directed axially toward the piston, said piston having a shallow flat bottom crater concentrically disposed in its head, and a small depression in the center of the crater to receive said mixture and induce it to spread radially outwardly within the main combustion chamber.

References Cited in the file of this patent

UNITED STATES PATENTS

| | | |
|---|---|---|
| 1,423,085 | Crossley et al. | July 18, 1922 |
| 1,524,894 | Thomson et al. | Feb. 3, 1925 |
| 2,775,493 | Cheney | Dec. 25, 1956 |
| 2,804,858 | Schilling | Sept. 3, 1957 |

FOREIGN PATENTS

| | | |
|---|---|---|
| 268,235 | Italy | Oct. 8, 1929 |